United States Patent

Marcus

[15] 3,666,925

[45] May 30, 1972

[54] CODED TAPE AND OPEN CONTACT SENSING CIRCUIT

[72] Inventor: Ira R. Marcus, Rockville, Md.

[73] Assignee: The United States of America as represented by the Secretary of the Army

[22] Filed: May 21, 1970

[21] Appl. No.: 39,402

[52] U.S. Cl. ..............235/61.11 A, 340/347 P, 235/61.12 C

[51] Int. Cl. .............G06r 7/06

[58] Field of Search ...........340/347 PR; 235/61.111, 61.113

[56] References Cited

UNITED STATES PATENTS

| | | | |
|---|---|---|---|
| 3,015,814 | 1/1962 | Lippel | 340/347 |
| 3,027,071 | 3/1962 | Braun et al. | 235/61.11 |
| 2,873,441 | 2/1959 | Miller | 340/347 PR |
| 3,030,513 | 4/1962 | Bayliss et al. | 340/347 PR |
| 3,328,541 | 6/1967 | Ryno et al. | 235/61.11 C |

*Primary Examiner*—Thomas A. Robinson
*Attorney*—Harry M. Saragovitz, Edward J. Kelly, Herbert Berl and J. D. Edgerton

[57] ABSTRACT

A coded tape used to preset a binary counter to any desired predetermined count is composed of two principal parts. The first part comprises an insulating layer or substrate and a conducting layer. The conducting layer is etched or scribed to divide it into a plurality of bit tracks. The second part also comprises two layers and may comprise an insulating layer and a conducting layer which are punched out in the form of the Gray Code pattern. This part is laminated to the first part to form a unitary structure. Alternatively, a conductive layer is bonded to the first part by an adhesive which acts as an insulating layer. The second conductive layer and adhesive are selectively etched to form the Gray Code pattern. One of the conducting layers is biased through a resistance to ground while the other is biased to a different potential. The binary counter is preset by positioning the tape with respect to a read head having a brush for each of the plurality of bit tracks. The code at that point on the tape is transferred from the read head through a code converter to the binary counter. A brush contacting the first conductive layer causes a binary "zero" to be read, and a brush contacting the second conductive layer causes a binary "one" to be read. The open contact sensing circuit senses when any brush is not in contact with either the first or second conductive layers and prevents the binary counter from being preset.

5 Claims, 12 Drawing Figures

INVENTOR
IRA R. MARCUS

BY By: Harry M. Saragovitz
Edward J. Kelly
Herbert Berl
J. D. Edgerton

ATTORNEYS

INVENTOR
IRA R. MARCUS
BY
By: Harry M. Saragovitz
Edward J. Kelly
Herbert Berl
J. D. Edgerton
ATTORNEYS

INVENTOR
IRA R. MARCUS

BY

By: Harry M. Saragovitz
Edward J. Kelly
Herbert Berl
J. D. Edgerton
ATTORNEYS

CODED TAPE AND OPEN CONTACT SENSING CIRCUIT

GOVERNMENT RIGHTS

The invention described herein may be manufactured and used by or for the Government of the United States of America for Governmental purposes without the payment to me of any royalty thereon.

BACKGROUND OF THE INVENTION

1. Field of the Invention

The present invention generally relates to coded records, and more particularly to a coded tape having two conductive layers adapted to be biased to different potentials representing a binary code and a cooperating open contact sensing circuit to prevent read out from the tape in the event that a reading member fails to make electrical contact with one or the other of the conductive layers.

2. Description of the Prior Art

It is often desired to read a code from a coded record wherein the code on the record varies with its position relative to read head. The purpose may be to determine the position of the record in which case the record may be part of a digital encoder. On the other hand, the purpose may be to read a specific or predetermined segment of the code into a data receiving element. For example, there are a number of applications in which it is required to preset a counter with a predetermined count or number. This may be accomplished with a coded record such as a moving tape or the like. The tape is made to move with respect to a read head provided with a plurality of tracks corresponding to the number of digits in the code. When the desired segment of the code on the tape is adjacent the read head, the read head is energized, and the code read out through a code converter into a settable counter.

The simplest and most common method of coding is the binary code. If the binary code is employed and the settable counter is a binary counter, then the code converter may be a simple transfer circuit. For purposes of illustration, it is assumed that the coded tape is in the form of an insulating member carrying a conductive layer having a binary coded pattern. The conductive layer is biased to some potential. Such a tape is typically read with a read head comprising a plurality of brush contacts, there being one contact for each track of the tape. It is further assumed that the tape is provided with seven tracks corresponding to seven binary digits or a total of 128 binary words. At the mid-point of this tape between the 63rd and 64th word, the binary code changes from 0111111 to 1000000. Where there is a requirement of continuous position reading of the tape, problems arise when the brush contacts are slightly misaligned. An erroneous read out of 127 when the read out should be 63 would be caused if the brush contact in the most significant track were slightly advanced with respect to the other brush contacts. On the ocher hand, an erroneous read out of zero when the read out should be 64 would be caused if this same brush were slightly behind the other brushes.

One common way to overcome this difficulty is to employ two brush contacts for each bit track except for the track corresponding to the least significant digit where only one brush contact is required. The pairs of contacts are located symmetrically about a center line, and the distance between each pair of contacts increases in a binary progression. A relatively simple code converter provides an unambiguous read out. A more complete discussion of this technique may be had with reference to *Logical Design of Digital Computers* by Montgomery Fister, Jr., published by John Wiley & Sons, Inc., 1958, pages 231 and 232. While this procedure eliminates uncertainties because of the characteristics of the binary number system, the size of the read head becomes quite large where the coded record is a tape. As a result, this technique is most satisfactorily applied where it is desired to sense the angular displacement of a shaft and the bit tracks are concentric circular sections on a disc-shaped coded record.

The ambiguities which arise in the use of an ordinary binary code may be eliminated in another way which does not require the addition of a double brush read out head. Since these ambiguities are caused by a change of more than one bit state from one word to the next, a code in which only one bit state changes from one work to the next may be used. Such a code is called a unit distance code, the most popular one of which is known as the Gray Code after its originator.

While the Gray Code eliminates ambiguities associated with the characteristics of the binary code, the mechanics of reading from the coded tape introduce still other ambiguities. It is usual to read out a binary "one" when a brush contacts the conductive layer of the tape and senses the potential applied thereto. When a brush contacts the insulating member a binary "zero" is read out. A problem arises when the surface of the conductive layer becomes dirty or a brush contact for some reason fails to make good electrical contact with the conductive layer when it is supposed to. Under these circumstances, a binary "zero" is erroneously read out for that particular contact.

SUMMARY OF THE INVENTION

It is therefore an object of the present invention to provide a record reading system capable of sensing the three conditions of a binary "one" state, a binary "zero" state and an open contact state.

It is a further object of this invention to provide a coded record capable of being unambiguously read by a plurality of brush contacts.

It is another object of the invention to provide an open contact sensing circuit for such a coded record for developing an output indication when a brush fails to make electrical contact with the coded record.

According to the present invention, the foregoing and other objects are attained by providing a four layer coded tape. The tape comprises two conductive layers one of which is divided into a plurality of tracks. This layer is carried by a base insulating substrate. The other conductive layer is separated from the first conductive layer by an insulating layer and together with the insulating layer is punched out or otherwise formed in the Gray Code pattern. The two conductive layers are each biased to different potentials representing a binary "one" or binary "-zero." Each of the brush contacts are connected to an open contact sensing circuit. The open contact sensing circuit provides no output so long as all of the brushes contact one or the other of the conductive layers. If any one or more of the brushes fails to make electrical contact with one of the conductive layers, then the open contact sensing circuit provides an output which inhibits the read out from the coded tape.

BRIEF DESCRIPTION OF THE DRAWINGS

The specific nature of the invention, as well as other objects, aspects, uses and advantages thereof, will clearly appear from the following description and from the accompanying drawing, in which.

DESCRIPTION OF THE PREFERRED EMBODIMENT

Figure 1:
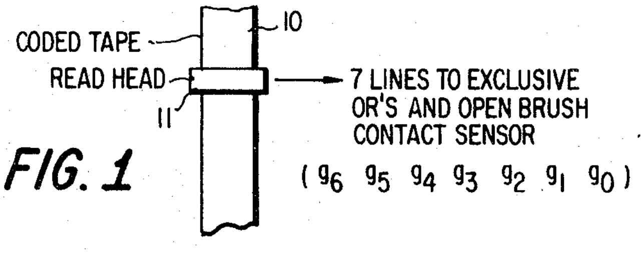
FIG. 1 is a schematic illustration of the relationship of the coded tape and the read head.

Referring now to the drawings wherein like reference numerals designate identical or corresponding elements throughout the several figures, and more particularly to FIG. 1, a coded tape 10 is preferably encoded with the Gray Code. A cooperating read head 11 having seven brush contacts senses the code on tape 10. The output from read head 11 comprises seven lines which are connected to a Gray Code to binary converter and the open brush contact sensor. The conversion from Gray Code to binary is as follows:

$B_{n-1}=g_{n-1}$ where $n-1$ is the significant bit, and $B_n=B_{n+1}\bar{g}_n+\bar{B}_{n+1}g_n$ where $n$ is any bit but the most significant bit.

For example, the number 78 in Gray Code is 1101001 and its conversion to binary is as follows:

$B_6=0\bar{g}_6+1g_6=1$ $B_5=B_6\bar{g}_5+\bar{B}_6g_5=0$ $B_4=B_5\bar{g}_4+\bar{B}_5g_4=0$ $B_3=B_4\bar{g}_3+\bar{B}_4g_3=1$ $B_2=B_3\bar{g}_2+\bar{B}_3g_2=1$ $B_1=B_2\bar{g}_1+\bar{B}_2g_1=1$ $B_0=B_1\bar{g}_0+\bar{B}_1g_0=0$ Thus, 1001110 is the binary number 78, and all conversion equations are exclusive OR logic gates.

Figure 2:
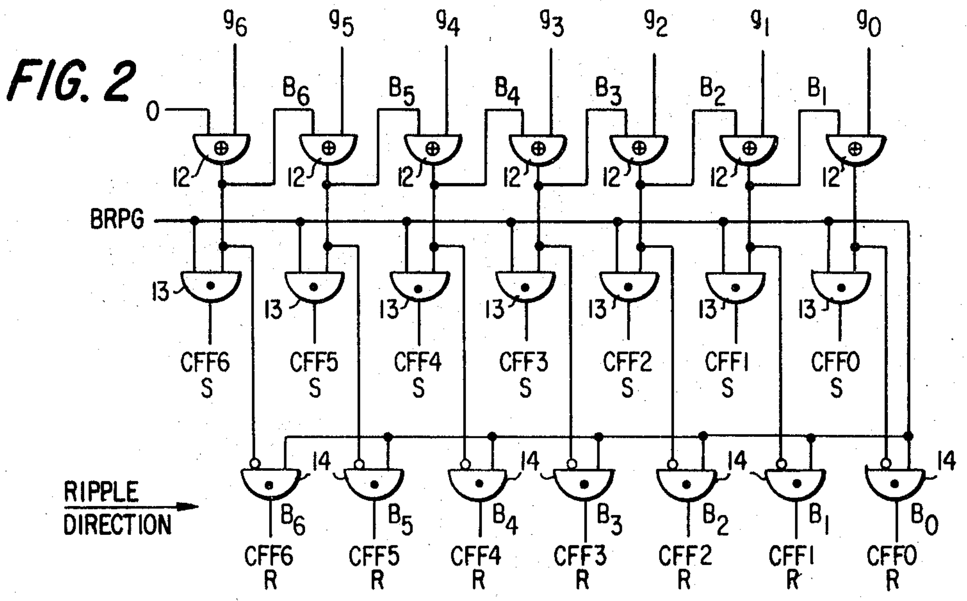
FIG. 2 is a logic diagram of a Gray to binary code converter.

FIG. 2 shows the Gray Code to binary converter. Each bit from the read head 11 requires one exclusive OR circuit, one inverter and two AND circuits. The exclusive OR circuits are connected to ripple through from left to right in the figure. For example, logical "zero" is combined in the first exclusive OR gate with $1g_6$ from the brush contact which senses the most significant bit track on the coded tape 10 to generate $B_6$. The output of this exclusive OR gate is then combined with $g_5$ from the next most significant bit track sensing brush contact in the second exclusive OR gate to produce $B_5$, and so forth. Obviously, the first exclusive OR gate could be omitted since the gate will always be open to $g_6$. The output from each exclusive OR gate 12 is connected to the input of a respective AND gate 13 and also to the inverting input to a respective AND gate 14. All of the AND gates 13 and 14 receive a gating pulse from a Brush Read Out Pulse Generator. When this pulse is received, the output from the exclusive OR gates 12 are gated into a settable counter. The outputs from AND gates 13 are applied to the set side of the individual counter stages, while the outputs from AND gates 14 are applied to the reset sides of the individual counter stages.

Figure 3:
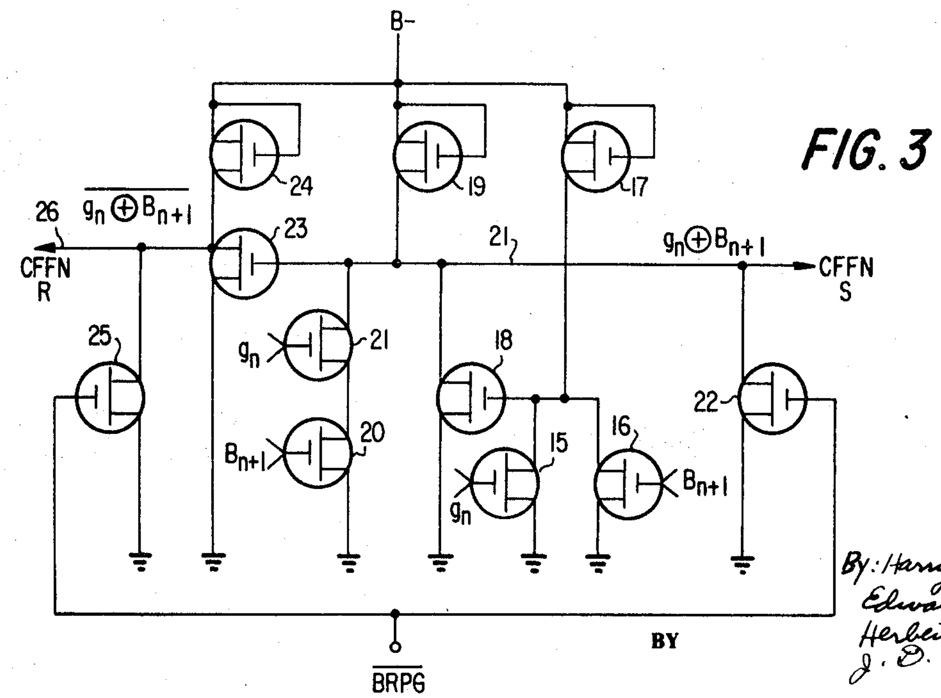
FIG. 3 is a schematic diagram of one stage of the Gray to binary code converter using MOSFET integrated circuitry.
Figure 7A:
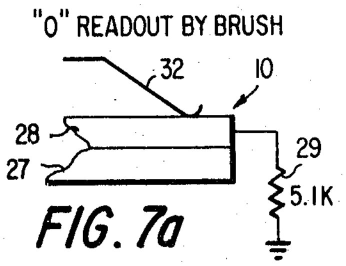
FIGS. 7*a*, 7*b*, 7*c* and 7*d* illustrate four possible conditions which can exist between any particular brush contact and the tape shown in FIG. 6.
Figure 7B:
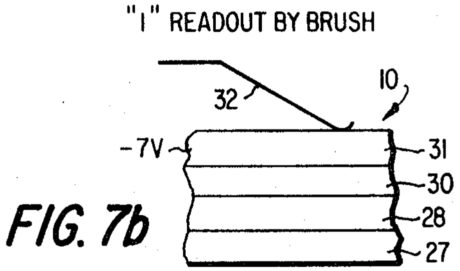
Figure 7C:
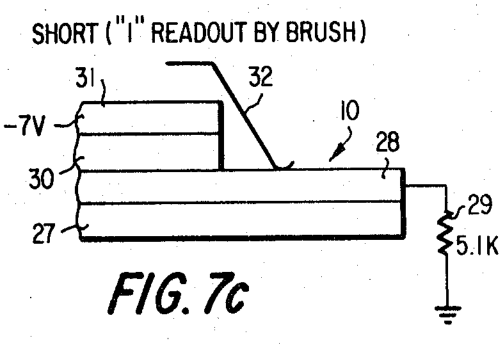
Figure 7D:
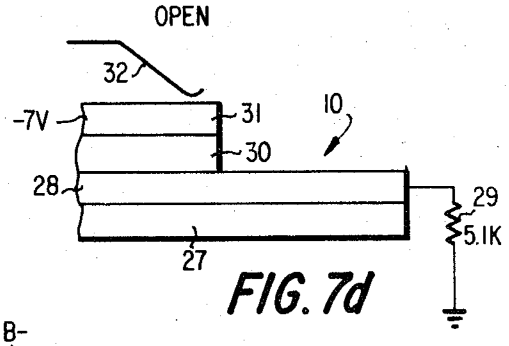

FIG. 3 shows how the logic functions of FIG. 2 can be efficiently formed with MOSFETs. The logic system used is B— is a logical "one" and ground is a logical "zero." The exclusive OR circuit is formed by transistors 15 and 16 which have their drain electrodes connected in common to the source electrode of transistor 17. The source electrodes of transistors 15 and 16 are connected to ground. Transistor 17 has its gate and drain electrodes connected together to the source of supply potential B—. As connected transistor 17 acts a load resistor. The junction of the drain electrodes of transistors 15 and 16 are connected to the gate electrode of transistor 18. Transistor 18 has its source electrode connected to ground and its drain electrode connected to the source electrode of transistor 19. Transistor 19 also has its gate and drain electrodes connected in common to the source of potential B— and acts as a load resistance. $g_n$ from the $n$th brush contact is connected to the gate electrode of transistor 15, and the output $B_{n+1}$ of the next higher order exclusive OR gate is connected to the gate electrode of transistor 16. A logical "one" appearing at the gate electrodes of either of transistors 15 or 16 will cause ground potential to be applied to the gate electrode of transistor 18 preventing it from conducting. As a result, a logical "one" would normally appear at the drain electrode of transistor 18. This is prevented, however, in the event that both $g_n$ and $B_{n+1}$ are both logical "one's" by transistors 20 and 21. Transistor 20 has its source electrode connected to ground and its drain electrode connected to the source electrode of transistor 21. Transistor 21 has its drain electrode connected to the common junction of the drain electrode of transistor 18 and the source electrode of transistor 19. $g_n$ is connected to the gate electrode of transistor 21 while $B_{n+1}$ is connected to the gate electrode of transistor 20. In the event that both gand $B_{n+1}$ are both logical "one'S," both of transistors 20 and 21 conduct to cause ground potential to appear on line 21. AND gate 13 in FIG. 2 are formed by a shunt gate comprising transistor 22 having its source electrode connected to ground and its drain electrode connected to line 21. The logical inversion of the Brush Read Out Pulse Generator pulse is applied to the gate electrode of transistor 22. The output on line 21 is inverted by an inverter comprising transistor 23 having its source electrode connected to ground and its drain electrode connected to the source electrode of transistor 24. Transistor 24 has its drain and gate electrodes connected together to the source of potential B— and acts as a load resistor. The gate electrode of transistor 23 is connected to line 21 so that the output from the drain electrode of transistor 23 is the logical inversion of the signal appearing on line 21. AND gate 14 in FIG. 2 is also formed by a shunt gate comprising transistor 25 having its source electrode connected to ground and its drain electrode connected to the output line 26. The logical inversion of the Brush Read Out Pulse Generator is also applied to the gate electrode of transistor 25.

We now examine the limits of misalignment of the seven brush contacts of the read head 11. We know that the Gray Code will read within one count of the intended count if the misalignment is held to the width, W, of the word.

Figure 4:
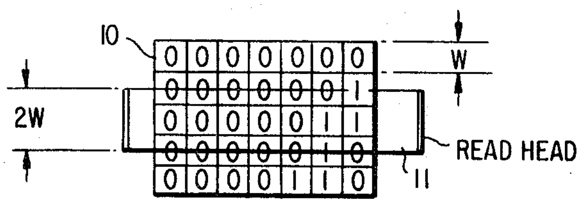
FIG. 4 is a schematic illustration of the limits of misalignment of seven brush contacts with respect to a coded tape having the Gray Code pattern.
Figure 5:
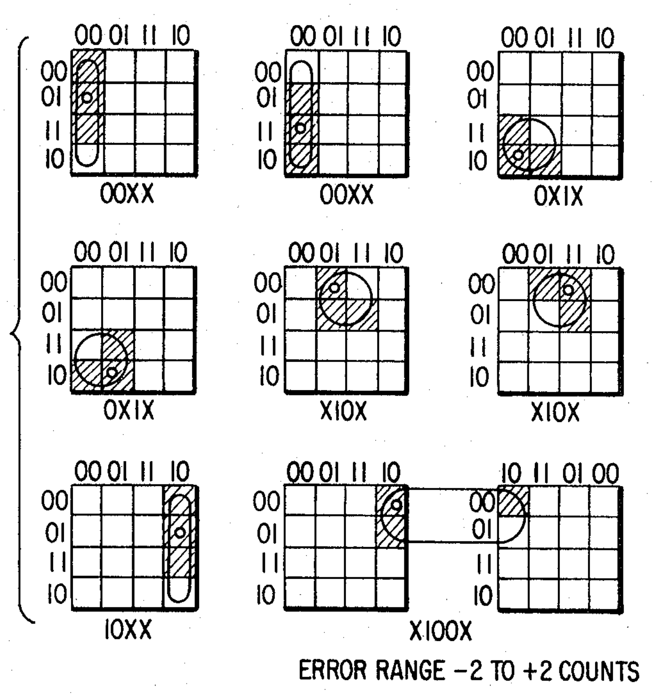
FIG. 5 shows how the misalignment illustrated in FIG. 4 is determined through the use of Karnaugh maps.

In FIG. 4, the misalignment is assumed to be less than 2W which produces an error range of plus or minus two counts. This is seen by examining the Karnaugh maps in FIG. 5. The read out is shown by a dot on the map while the shaded area shows the possible read head read outs. The encircled area contains all of the possible words made up of the contacts falling randomly on the shaded areas. For example, the first map shows the intended word to be 0011, while the actual read out could be 00XX. Thus, the error range for this situation is −1, +2. Map situations are shown for all possibilities and indicate a total error range of −2 to +2 counts. By applying this same mapping technique, a total error range of +5 or −5 counts can be shown to exist for a misalignment of less than 3W. It may be concluded that the design of the coded tape pattern width W should be slightly greater than the maximum tolerance of the read head contact misalignment. Gross errors will not occur as with a simple binary read out head.

Figure 6:
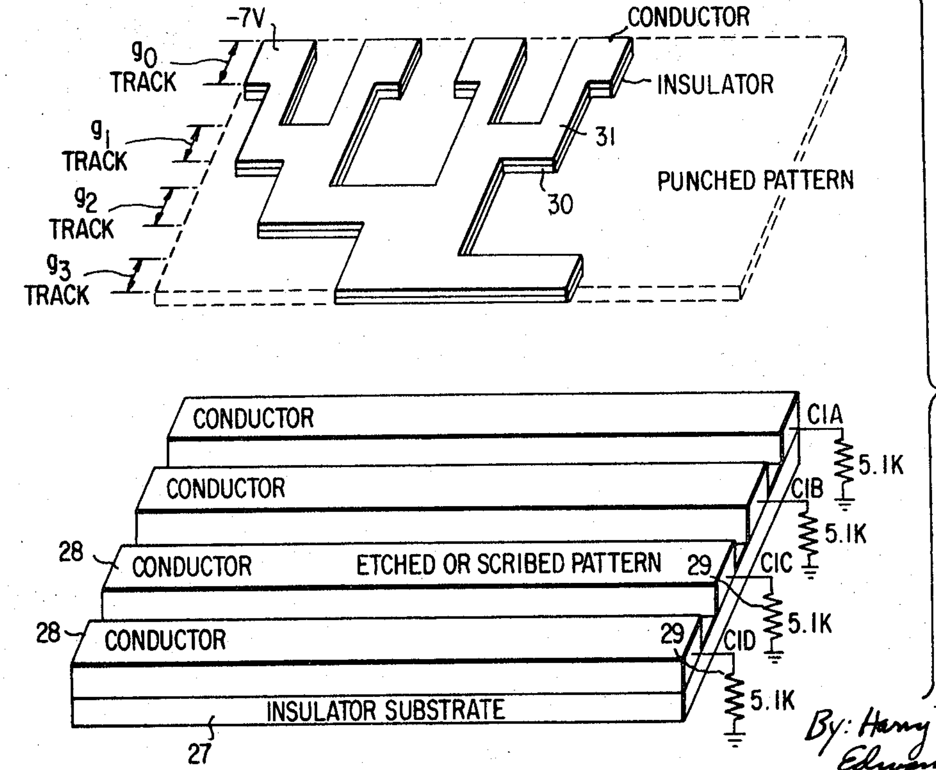
FIG. 6 is an exploded view of the coded tape according to the present invention.

The design and structure of the coded tape 10 is shown in an exploded view in FIG. 6. Most coded patterns are arrays of conductive material at some potential on an insulated substrate. As the brush contact moves across the surface it makes contact in some positions with the conductor and senses the voltage, which indicates one binary state, while in other positions it does not sense the conductor, but the insulator instead, and senses the other binary state. This technique does not have the capability of sensing a dirty or open contact and sometimes gives a false readout. In order to sense the three conditions of a binary "one" state, a binary "zero" state and an open contact state, a three state system is indicated. This is provided according to the present invention in part by the coded tape and in part by the open contact sensor. The coded tape itself comprises a first insulator substrate 27 which may be, for example, a glass-filled epoxy board. Bonded to the substrate 27 is a conductor 28 which may be etched or scribed to divide it into a plurality of bit tracks. As will become more clear in a later part of the description, the purpose of this division into tracks is to provide isolation between tracks, thereby preventing a false read out of a correctly positioned brush reading a binary "zero" by a shorted brush on another track. The conducting layer 28 may be copper or copper coated with nickel to promote wear resistance, and the substrate 27 and the conductor 28 may be conveniently manufactured according to conventional printed circuit techniques. It it were desired to make the tape flexible, the substrate 27 could be Mylar or other suitable material. Each of the bit tracks etched in the conductor 28 are separately connected to ground by individual 5.1K resistors 29.

The second section of the coded tape is in the form of the Gray Code pattern itself. This comprises a second insulator 30 to which there is applied a second conductor 31. As a specific example, a plastic film of three mil polymethylmethacrylate as insulator 30 is placed over the previously etched conductor 28. A 1 mil copper foil which is to comprise the conductor 31 is placed over the plastic film, and the foil and film are fused to the first section of the tape comprising the insulator 27 and the conductor 28 at 200 psi at 140° C for 2 minutes. The pattern in conductor 31 and insulator 30 is formed in a two step etch process. The first etch is a normal printed circuit etch which forms the conductor 31 into the Gray Code pattern. This exposes the plastic film 30 which is then etched with methylene chloride. This technique of construction produces a high resolution tape. Where high resolution is not a requirement, the insulator 30 and conductor 31 may be conveniently punched out and laminated to the insulator 27 and conductor 28. Obviously, alternate schemes of fabrication will suggest themselves to those skilled in the art; for example, insulator 30 could be an adhesive such as a rubber-based adhesive which may be selectively removed after the foil 31 has been etched in a normal manner.

Figure 8:
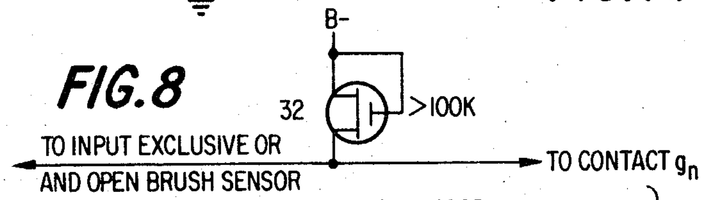
FIG. 8 is a schematic diagram of a MOSFET sensing circuit for a single brush contact.

FIGS. *7a*, *7b*, *7c* and *7d* illustrate the various possibilities when a brush 32 coacts with the tape 10 constructed in accordance with the present invention. FIG. *7a* shows the proper read out of the binary "zero" state which is defined as ground potential. In this case, the brush contact 32 is contacting the conducting layer 28. FIG. *7b* shows the proper read out of a binary "one" state, wherein the brush contact 32 is in contact with the conducting foil 31. In this case, the foil 31 is biased to −7 volts which is defined as a binary "one." FIG. *7c* shows the intermediate position at a transition point where the brush contact 32 shorts conductive layers 28 and 31. The brush reads out a binary "one" which is acceptable for the Gray Code. The 5.1K resistor 29 provides isolation between the conducting layers and limits the shorting current. Because only one bit transition takes place per position, only one brush can short at one time. FIG. *7d* illustrates the condition wherein the brush 32 fails to make contact with either conductive layer 28 or conductive layer 31. This may be caused by the brush being bent or by dirt accumulation on the conductive layers. In any event, the brush 32 does not have a −7 volt potential or a ground potential applied to it. FIG. 8 shows the basic brush contact sensing circuit which comprises an MOS transistor 32 for each brush contact. The gate and drain electrodes of transistor 32 are connected in common to the source of voltage B−, and the source electrode of transistor 32 is connected to the respective brush contact and also to the Gray Code to binary converter and open brush sensor. Thus, transistor 32 is connected in the form of a resistor. As connected, transistor 32 presents a high impedance, greater than 100K, from the source of voltage B− to the respective brush contacts. When an open brush contact occurs as shown in FIG. *7d*, the voltage that appears at the input of the Gray Code to binary converter and the open brush sensor is equal to the supply voltage, B−, less the threshold voltage of transistor 32 and is considerably more negative than the −7 volts defined as a binary "one."

Figure 9:
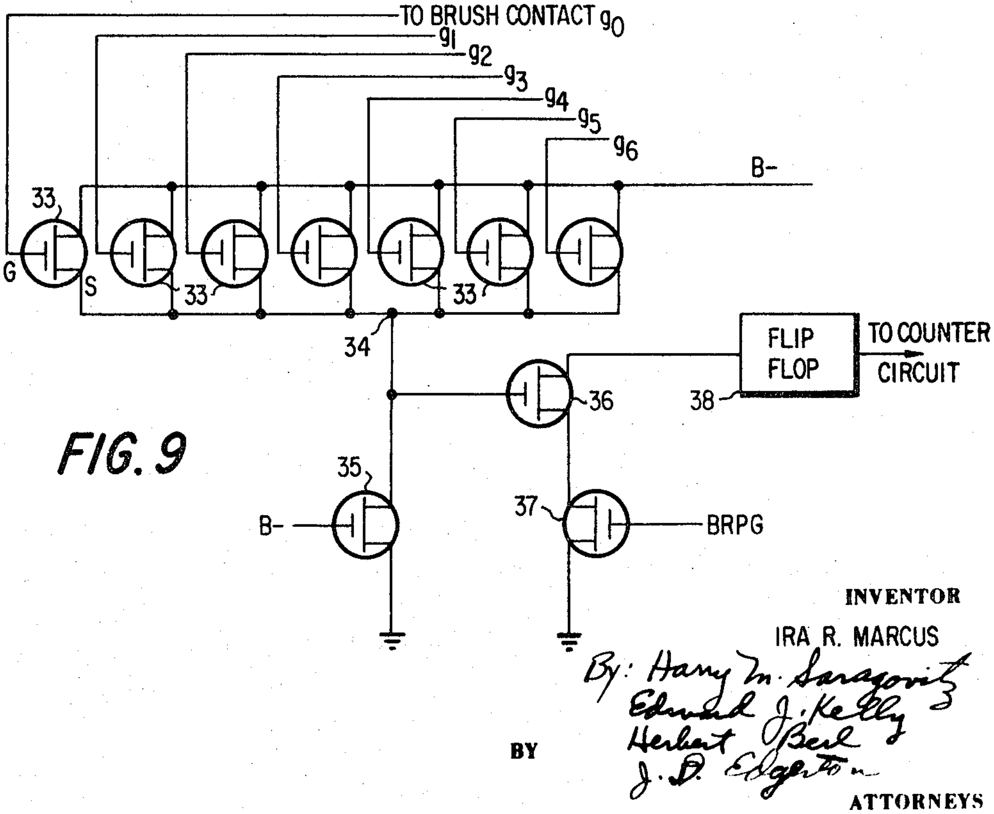
FIG. 9 is a schematic diagram of the open brush contact sensor circuit using MOSFET integrated circuitry according to the present invention.

FIG. 9 shows the circuitry for the open brush contact sensor. When any brush contact during read out does not show a binary "one" indicated by −7 volts or a binary "zero" indicated by ground potential, then ((B−)−$V_T$), where $V_T$ is the threshold voltage, appears at the contact. Assuming a threshold voltage $V_T$ of approximately 4 volts and a supply voltage B− of −20 volts, then the open brush contact voltage is approximately −16 volts. Each of the brush contacts in read head 11 are connected to the gate electrodes of a respective one of MOS transistors 33. Transistors 33 all have their drain electrodes connected in common to the source of supply potential B− and their source electrodes connected in common to point 34. Point 34 is connected to the drain electrode of MOS transistor 35 which has its source electrode connected to ground. The gate electrode of transistor 35 is connected to the source of supply potential B−. Thus, transistor 35 acts as a follower load resistor having a value of approximately 10K. Transistors 33 in combination with the transistor 35 form a multiple input OR circuit. The potential at point 34 is equal to the brush contact potential minus 2$V_T$ since the transistors 33 will also provide voltage drops equal to their threshold voltages. The drain electrode of transistor 35 is connected to the gate electrode of a MOS transistor 36. If a brush contact reads ground or −7 volts, transistor 36 remains off since it requires a threshold voltage $V_T$ of at least −3 volts minimum to turn it on at its gate. For a minimum threshold voltage $V_T$ of −3 volts, the most negative voltage that can appear at point 34 when the brush contacts read a word composed of binary "zero's" and binary "one's" is (−7 −2(−3)) = −1 volt. −1 volt is not enough to turn on transistor 36. If, however, one of the brushes reads an open circuit, then point 34 becomes (−20 −2(−5)) = −10 volts, assuming that the maximum value of $V_T$ is −5 volts. Ten volts is enough to turn is enough to turn on transistor 36.

The source electrode of transistor 36 is connected to the drain electrode of transistor 37. Transistor 37 has its source electrode connected to ground and its gate electrode connected to receive the Brush Read Out Pulse Generator pulse. As connected, transistors 36 and 37 form an AND gate such that when an open contact occurs coincident with a Brush Read Out Pulse Generator pulse the drain electrode of transistor 36 is at ground potential. This condition indicates that an open brush contact occurs during the brush read out interval. The drain electrode of transistor 36 is connected to a flip-flop 38 which is reset at time zero by an automatic reset circuit (not shown). When the drain electrode of transistor 36 goes to ground, the output of flip-flop 38 becomes a binary "one" and is used to disable the read out to the settable counter.

It will be apparent that the embodiment shown is only exemplary and that various modifications can be made in construction and arrangement within the scope of the invention as defined in the appended claims.

I claim:

1. A coded record for cooperating with a read head having a plurality of brush contacts, comprising:

a. a first insulating layer, b. a first electrically conductive layer bonded to said first insulating layer and divided into a plurality of bit tracks, c. a second insulating layer, and d. a second electrically conductive layer, both said second insulating layer and said second conductive layer being bonded to said first conductive layer and formed into a coded pattern, each layer being non-planar with the other layers to form a laminate structure, said first conductive layer connected to a first potential and said second conductive layer connected to a second potential.

2. The combination of a coded record and an open brush contact sensor, comprising:

a. a coded record for cooperating with a read head having a plurality of brush contacts including:

1. a first insulating substrate, 2. a first conductive layer bonded to said first insulating substrate and divided into a plurality of bit tracks, said first conductive layer being connected to a first potential, 3. a second insulating layer, and 4. a second conductive layer, both said second insulating layer and said second conductive layer being bonded to said first conductive layer and formed into a coded pattern, said second conductive layer being connected to a second potential, b. a read head having at least one brush contact for each bit track, the brush contact sensing the occurrence of a first or second potential on an associated track, and c. an open brush contact sensor connected to each of said brush contacts to provide a first output when all of said brush contacts sense either said first or second potential and a second output if any one of said brush contacts senses an open circuit.

3. The combination recited in claim 2 wherein the open brush contact sensor comprises:

a. a multiple input OR circuit connected to said brush contacts, and b. means for sampling the output of said multiple input OR circuit.

4. The combination as recited in claim 3 wherein each brush contact is connected to a supply potential greater than either of said first or second potentials through a large resistance, and said multiple input OR circuit comprises an MOS transistor for each brush contact, said MOS transistors having their drain electrodes connected in common to said supply potential and their source electrodes connected in common to the output of said multiple input OR circuit, said multiple input OR circuit providing a first output having a first voltage range when all of said brush contacts sense either said first or second potential and a second output at a substantially higher voltage than said voltage range if any one of said brush contacts senses an open circuit.

5. The combination as recited in claim 4 wherein said means for sampling includes an MOS transistor having its gate electrode connected to the output of said multiple input OR circuit, said MOS transistor having a minimum threshold voltage greater than said voltage range and a maximum threshold voltage less than said greater voltage.

* * * * *